(12) United States Patent
Sforzin et al.

(10) Patent No.: US 12,189,478 B2
(45) Date of Patent: Jan. 7, 2025

(54) CRC RAID RECOVERY FROM HARD FAILURE IN MEMORY SYSTEMS

(71) Applicant: Micron Technology, Inc., Boise, ID (US)

(72) Inventors: Marco Sforzin, Boise, ID (US); Paolo Amato, Boise, ID (US); Daniele Balluchi, Boise, ID (US)

(*) Notice: Subject to any disclaimer, the term of this patent is extended or adjusted under 35 U.S.C. 154(b) by 324 days.

(21) Appl. No.: 17/828,475

(22) Filed: May 31, 2022

(65) Prior Publication Data

US 2023/0236930 A1  Jul. 27, 2023

Related U.S. Application Data

(60) Provisional application No. 63/303,911, filed on Jan. 27, 2022.

(51) Int. Cl.
*G06F 11/10* (2006.01)

(52) U.S. Cl.
CPC .................. *G06F 11/1084* (2013.01)

(58) Field of Classification Search
CPC ........................................ G06F 11/1076–1096
USPC ........................................................ 714/6.24
See application file for complete search history.

(56) References Cited

U.S. PATENT DOCUMENTS

| | | | | |
|---|---|---|---|---|
| 5,948,110 A * | 9/1999 | Hitz | .................... | G06F 11/1076 714/E11.034 |
| 9,823,986 B2 * | 11/2017 | Li | ......................... | G06F 11/10 |
| 10,558,519 B2 * | 2/2020 | Gilda | .................... | G06F 1/3275 |
| 11,557,348 B1 * | 1/2023 | Bhat | ...................... | G06F 3/0652 |
| 2014/0063983 A1 * | 3/2014 | Daly | .................... | G06F 11/1076 365/189.011 |
| 2018/0113761 A1 * | 4/2018 | Ko | ...................... | G06F 3/0619 |

* cited by examiner

*Primary Examiner* — Joseph R Kudirka
(74) *Attorney, Agent, or Firm* — Wood IP LLC; Theodore A. Wood

(57) ABSTRACT

A system and method for memory error recovery in compute express link (CXL) components is presented. The method includes determining that a memory component has sustained a hard failure in a Cyclic Redundancy Check-Redundant Array of Independent Devices (CRC-RAID) mechanism. The method further includes determining a location of the memory component failure, wherein the CRC-RAID mechanism comprises a plurality of memory components configured as a plurality of stripes and initiates a write operation of user data to a location within a particular stripe, wherein the particular stripe contains a failed memory component. The method includes compensating for the failed memory component, wherein the compensating comprises a plurality of read operations prior to a writing of the user data.

17 Claims, 12 Drawing Sheets

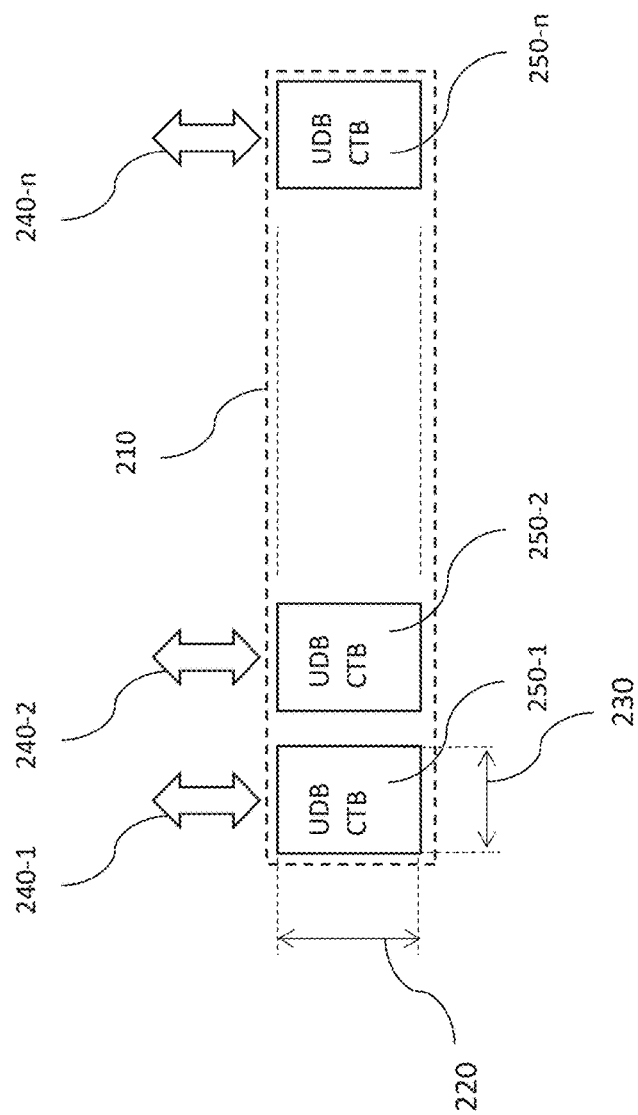

```
                                                    1100
┌─────────────────────────────────────────────────────────────┐
│ determining that a memory component has sustained a hard    │─1105
│ failure in a Cyclic Redundancy Check-Redundant Array of     │
│ Independent Devices (CRC-RAID) mechanism                    │
└─────────────────────────────────────────────────────────────┘
                              ↓
┌─────────────────────────────────────────────────────────────┐
│ determining a location of the memory component failure,     │─1110
│ wherein the CRC-RAID mechanism comprises a plurality of     │
│ memory components configured as a plurality of stripes      │
└─────────────────────────────────────────────────────────────┘
                              ↓
┌─────────────────────────────────────────────────────────────┐
│ initiating a write operation of user data to a location     │─1115
│ within a particular stripe, wherein the particular stripe   │
│ contains a failed memory component; and                     │
└─────────────────────────────────────────────────────────────┘
                              ↓
┌─────────────────────────────────────────────────────────────┐
│ compensating for the failed memory component, wherein the   │─1120
│ compensating comprises a plurality of read operations prior │
│ to a writing of the user data                               │
└─────────────────────────────────────────────────────────────┘
                              ↓
┌─────────────────────────────────────────────────────────────┐
│ further comprising determining that if the write operation  │─1125
│ of user data to a location within a particular stripe is    │
│ the location of the failed memory component, wherein the    │
│ compensating for the failed memory components in the        │
│ particular stripe, performing a logical XOR on the read     │
│ existing data from the remainder of non-failed memory       │
│ components and the user data to be written to the failed    │
│ memory component, and generating a RAID parity value to be  │
│ stored in the particular stripe                             │
└─────────────────────────────────────────────────────────────┘
                              ↓
┌─────────────────────────────────────────────────────────────┐
│ further comprising determining that if the write operation  │─1130
│ of user data to a first location within a particular stripe │
│ where the failed memory component is at a second location   │
│ within the particular stripe, wherein the compensating for  │
│ the failed memory component comprises reading an existing   │
│ user data from the first location, reading an existing RAID │
│ parity data, generating a new RAID parity value based on    │
│ performing a logical XOR on the existing user data from the │
│ first location, the existing RAID parity data, and the new  │
│ user data, and storing the new user data and new RAID       │
│ parity value in the particular stripe                       │
└─────────────────────────────────────────────────────────────┘
```

FIG. 11

CRC RAID RECOVERY FROM HARD FAILURE IN MEMORY SYSTEMS

CROSS-REFERENCE TO RELATED APPLICATION

This application claims priority to U.S. Provisional Application No. 63/303,911 filed on Jan. 27, 2022, titled "CRC RAID Behavior After a Hard Failure", which is hereby expressly incorporated herein by reference in its entirety.

FIELD OF TECHNOLOGY

This disclosure relates generally to one or more systems and methods for memory, particularly directed to the recovery of data from a hard failure in a memory system.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-20 dimensional cross-point memory (3D cross point), not—or (NOR) and not—and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

Some memory may be configured to support compute express link (CXL), which is an open standard for connections between high-speed processors and devices or memory. In memory devices, including those using the CXL standard, errors may occur during reading or writing, where such errors occur due to a component or device failure. Such device failures may occur at the chip level. In such instances error recovery techniques may be used to compensate or correct the error caused by the failed component.

BRIEF DESCRIPTION OF THE DRAWINGS

The accompanying drawings, which are incorporated herein and form part of the specification, illustrate the present disclosure and, together with the description, further serve to explain the principles of the present disclosure and to enable a person skilled in the relevant art(s) to make and use the present disclosure.

Additionally, the left-most digit of a reference number identifies the drawing in which the reference number first appears (e.g., a reference number "310" indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different states, locations in space, or recurring at different points in time (e.g., reference numbers "110a" and "110b" may indicate two different input devices which may functionally the same, but may be located at different points in a method, or "210'" and "210''" may indicate a device in different points in time).

FIG. 2A illustrates a functional block diagram of a stripe within a RAID memory array, according to an embodiment of the present disclosure.

FIG. 11 is a flow diagram of an example method for recovery in a RAID memory array, according to an embodiment of the present disclosure.

Further embodiments, features, and advantages of the present disclosure, as well as the operation of the various embodiments of the present disclosure, are described below with reference to the accompanying figures.

DETAILED DESCRIPTION OF THE DISCLOSURE

While embodiments described herein are illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

Some interfaces (e.g., the Compute Express Link ("CXL") interface) are designed to be used between a host system and one or more memory systems. For example, the memory systems may use memory coherently across the host system and memory system. In the event of a memory chip failure other system components may be used to recover any data loss from the computer memory systems, which may also be referred to as chipkill protection in CXL devices.

Various embodiments of the system and method are discussed below with reference to FIGS. 1-11. However, those skilled in the art will readily appreciate that the detailed description given herein with respect to these FIGS. is for explanatory purposes only and should not be construed as limiting.

Figure 1:
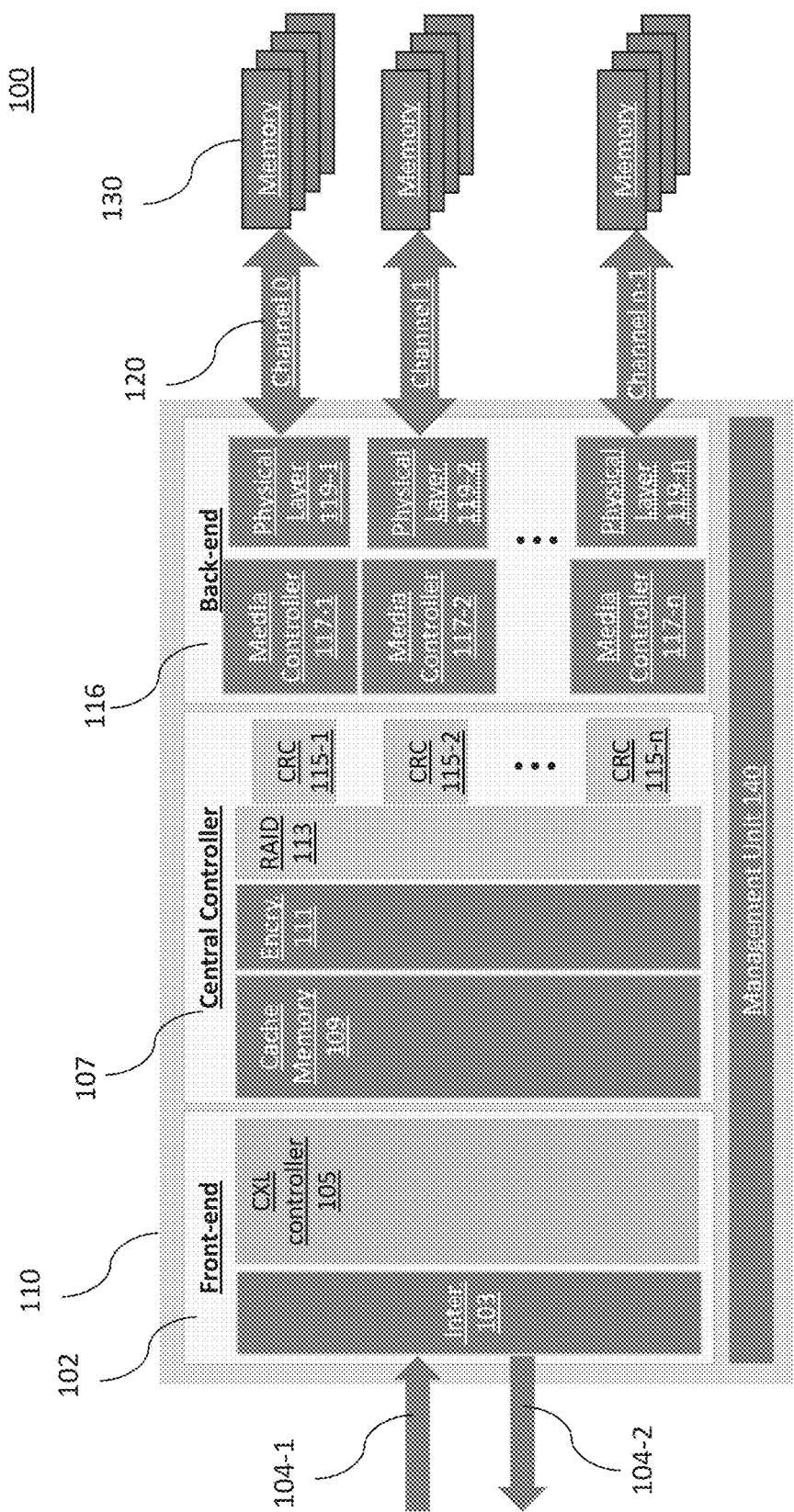
FIG. 1 illustrates a functional block diagram of a CRC RAID architecture controller, according to an embodiment of the present disclosure.

FIG. 1, illustrates a CRC-RAID system architecture 100, according to an embodiment. The term "CRC" refers to cyclic redundancy check. The term "RAID" typically refers to a Redundant Array of Inexpensive Disks or a Redundant Array of Independent Disks. However, for the purposes of this application as this application is directed to memory systems, RAID will mean a Redundant Array of Independent Devices but maintains the same functionality. For example, RAID 4 may consist of block-level striping with dedicated parity. RAID 5 may consist of block-level striping with distributed parity where the parity information is distributed among multiple memory devices, where upon failure of a single memory device, subsequent reads may be calculated from the distributed parity such that no data is lost.

As shown in FIG. 1, a memory controller 110 may include a front end 102, a central controller 107, and a back end 116. The front end 102 may also include an interface 103 that may include multiple I/O lanes 104-1 and 104-2 (individually or collectively referred to as I/O lanes 104 and may include any number of such lanes), as well as circuitry such as CXL controller 105 to manage the interface 103. The interface 103 may be a peripheral component interconnect express (PCIe) 5.0 interface coupled to the I/O lanes 104. In some embodiments, the CRC-RAID system architecture 100 may receive access requests involving at least one of the cache memory 109, a memory device via the interface 103 according to a CXL protocol. The interface 103 can receive data from a host (not shown) through I/O lanes 104. The CXL controller 105 may use CXL protocols to manage the interface 103.

The central controller 107 may be configured to cause an increase performance of a memory operation. The central controller 107 may include a cache memory 109 to store data associated with performance of the memory operation.

As further shown in FIG. 1, the memory controller 110 may include the central controller 107 that further may include an auxiliary security component such as encryption 111 to encrypt data before storing the data in the memory rank 130, which may be located within a variety of memory devices. In some embodiments, the encryption 111 may be bypassed when it is not used, such as when data is being written to the memory rank 130. In some embodiments, the encryption 111 may be enabled or disabled. For example, the encryption 111 may be enabled when writing memory to a persistent memory device, such as an FeRAM memory device.

As further shown in FIG. 1, the central controller 107 may include a RAID controller 113 and a cyclic redundancy check (CRC) circuit 115, where as shown, there may be a separate CRC circuit 115-1 through CRC circuit 115-n, where each separate CRC circuit is associated with a corresponding media controller 117. The CRC circuit 115 may consist of CRC encoding and decoding circuits.

As shown in FIG. 1, the back end 116 may include a media controller 117 comprising a plurality of media controllers 117-1, 117-2, through 117-n. Back end 116 may also contain a physical (PHY) layer 119 comprising a plurality of PHY layers 119-1, 119-2, through 119-n, (individually or collectively referred to as PHY layer 119). In some embodiments, the back end 116 is configured to couple the PHY layer portion 119 to a plurality of memory ranks 130-1 through 130-n (individually or collectively referred to as memory ranks 130). The memory ranks 130 may be connected to the memory controller 110 via a plurality of channels 120.

Each of the plurality of media controllers may receive a same command and address and drive the plurality of channels 120 substantially simultaneously. By using the same command and address for the plurality of media controllers, each of the plurality of media controllers may utilize the plurality of channels 120 to perform the same memory operation on the same plurality memory cells. Each media controller 117 may correspond to an associated RAID controller 113 component, as well as the CRC circuitry 115.

Each media controller 117 may also correspond to one of the plurality of PHY layers 119. In some embodiments, each media controller may execute commands independent of the other media controllers. Therefore, data may be transferred from a PHY layer 119 through a channel 120 to a memory rank 130 independent of other PHY layers 119 and channels 120.

The memory controller 110 may include a management unit 140 configured to recognize and manage sideband communications. In some embodiments, the management unit 140 includes an I/O bus to manage out-of-band data, a management unit controller to execute firmware whose functionalities include, but are not limited to, monitoring, and configuring the characteristics of the memory controller 110, and a management unit memory to store data associated with memory controller 110 functionalities. An endpoint of the management unit 140 may be exposed to the host system to manage data through a communication channel using an I/O bus. A second endpoint of the management unit 140 may be exposed to the host system to manage data through a communication channel. In some embodiments, the characteristics monitored by the management unit 140 may include a voltage supplied to the memory controller 110 or a temperature measured by an external sensor, or both. Further, the management unit 140 may include a local bus interconnect to couple different components of the memory controller 110. In some embodiments, a local bus interconnect may be an advanced high-performance bus (AHB). Further, the management unit 140 may include circuitry to manage in-band data. As used herein, the term "in-band data" generally refers to data that is transferred through the main transmission medium within a network, such as a local area network (LAN).

The management unit 140 may include a management unit controller. The management unit controller may apply an additional layer of encryption or decryption to sideband messages. In some embodiments, the management unit controller can be a controller that meets the Joint Test Action Group (JTAG) standard and operate according to an Inter-Integrate Circuit (I2C) protocol, and auxiliary I/O circuitry. As used herein, the term "JTAG" generally refers to an industry standard for verifying designs and testing printed circuity boards after manufacture. As used herein, the term "I2C" generally refers to a serial protocol for a two-wire interface to connect low-speed devices like microcontrollers, I/O interfaces, and other similar peripherals in embedded systems. However, embodiments are not so limited, and the circuit protocol may include multiple wire interfaces. In some embodiments, an auxiliary I/O circuitry can couple the management unit 140 to the memory controller 110. Further, firmware for operating the management unit can be stored in the management unit memory. In some embodiments, the management unit memory can be a flash memory such as flash NOR memory or other persistent flash memory device.

FIG. 2A, illustrates a functional block diagram of a stripe of data within a RAID memory array 200, according to an embodiment. Stripe 210 may include multiple strips, for example as illustrated with strips 250-1, 250-2 through 250-$n$ (collectively referred to as strips 250). Each strip 250 has a length, shown as bit length 220. Each strip 250 also has a width, shown as width 230. In some embodiments bit length 220 may be 32 bits and width 230 may be 16 bits. Typically, the amount of data required by a host is a User Data Block, shown as "UDB" that may typically be 64 bytes large. Further each UDB may be a strip 250 within the stripe 210. Further, a stream of data exchanged in a single access by a controller, for example, memory controller 110, and the component is referred to as a Component Transfer Block, shown as "CTB." Further, the CTB corresponds to an entire UDB. Further, a memory array may contain multiple stripes where a memory controller may access a particular UDB through a channel 240, for example stripe 210 may comprise channels 240-1, 240-2 through 240-$n$, where channel 240-2 might be used to access strip 250-2.

Figure 2B:
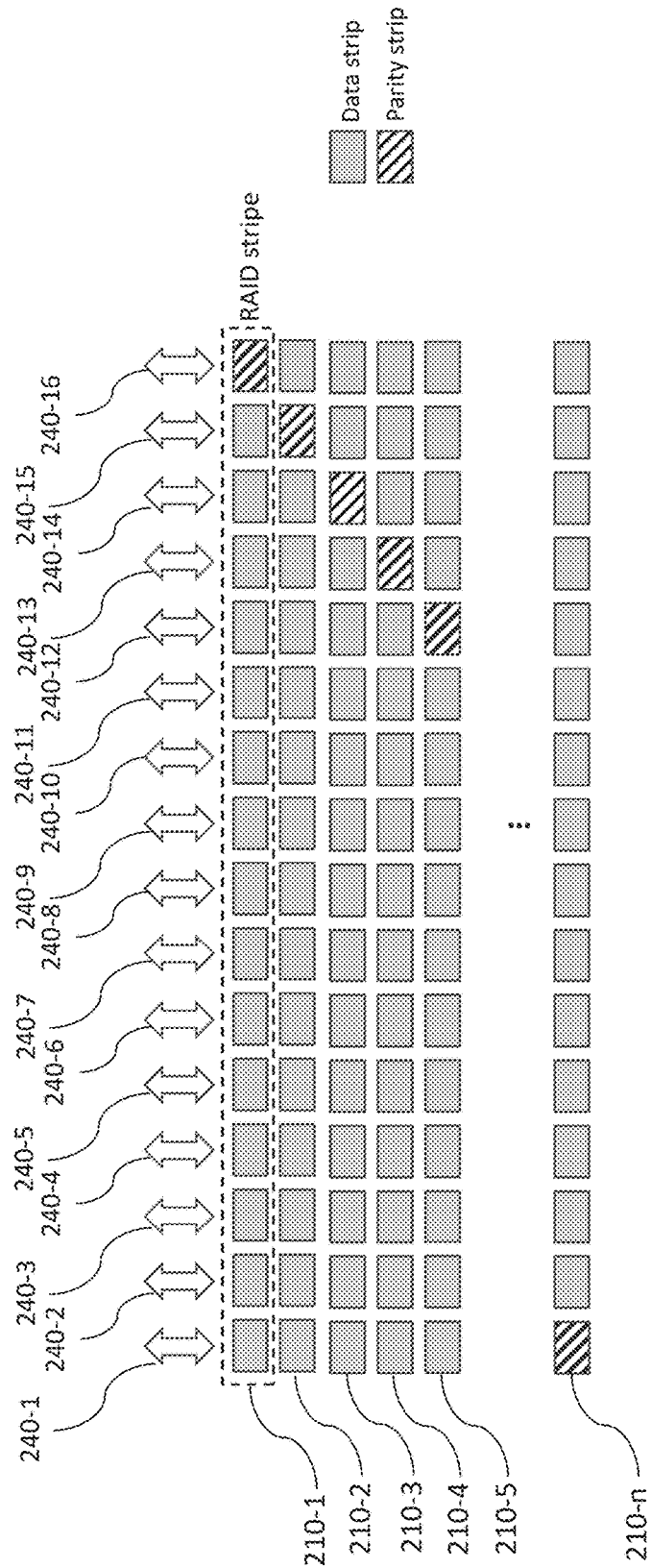
FIG. 2B illustrates a functional block diagram of a mapping of user data blocks over stripes in a RAID memory array, according to an embodiment of the present disclosure.

FIG. 2B, illustrates a functional block diagram of a mapping of user data blocks over stripes in a RAID memory array 200', according to an embodiment. As in FIG. 2A, FIG. 2B illustrates the storage of different UDBs in each location. RAID memory array 200' illustrates an example of channels 240-1 through 240-16 (individually or collectively referred to as channels 240) that may be used to access data and parity information in stripes 210-1 through 210-$n$ (individually or collectively referred to as stripes 210). Also, as shown in an embodiment that the parity information is distributed over the channels such that no one channel contains all of the parity information.

UDBs of the same RAID stripe are stored in different components and different channels. In this manner, if a particular component fails, just one UDB (strip) of the stripe is corrupted and thus can be recovered by RAID. Further, as the parity strip of the stripes is uniformly distributed over the channels, a performance bottleneck is avoided in accessing the parity channel. However, the parity strip must be updated every time a UDB in the stripe is update.

Figure 3:
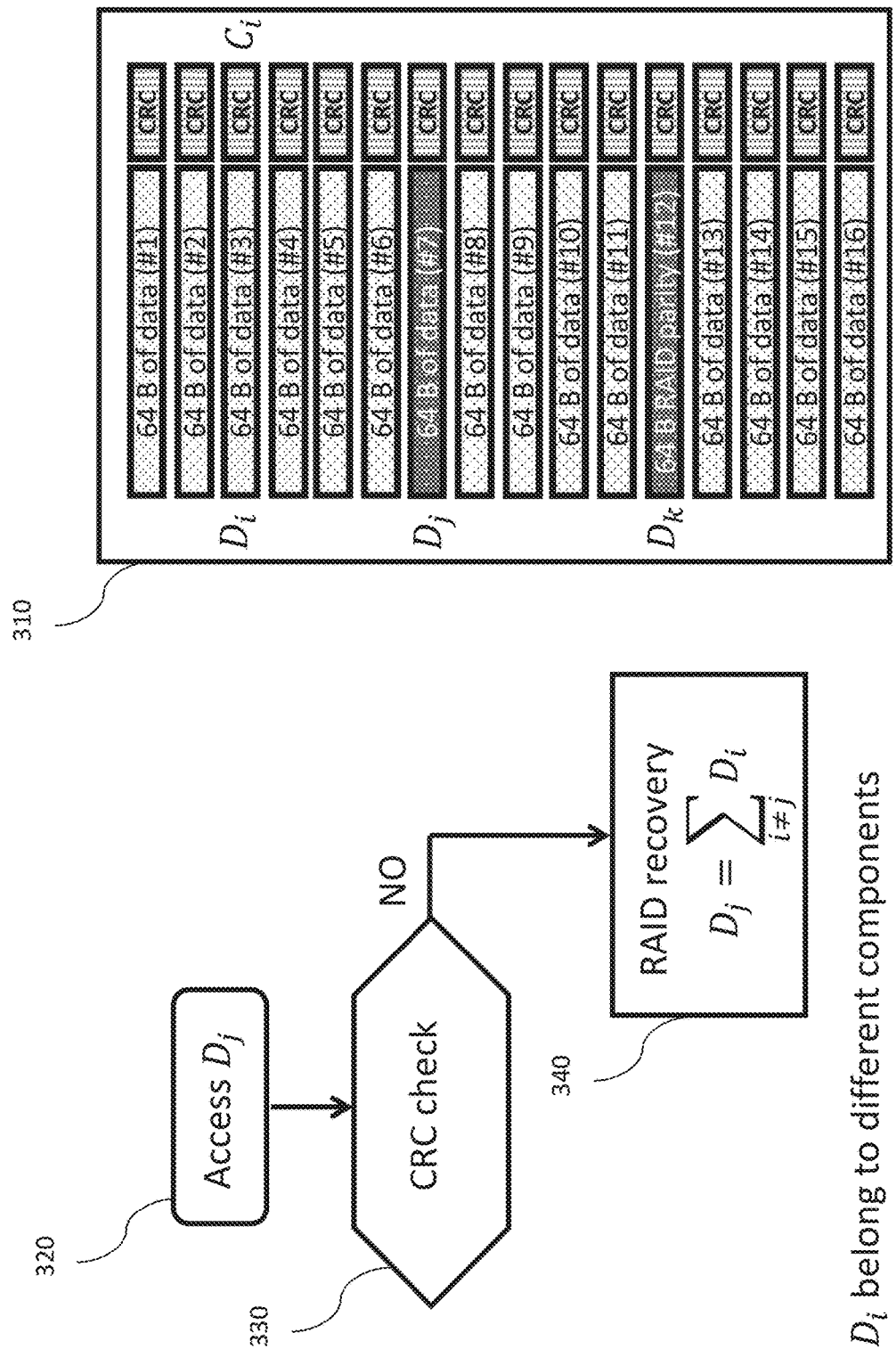
FIG. 3 illustrates a flow and block diagram cyclic redundancy check and recovery utilizing RAID, according to an embodiment of the present disclosure.

FIG. 3 illustrates an example of a CRC-RAID operation involving an error, according to an embodiment. The example illustrates RAID stripe 310, similar to RAID stripe 210-5 in FIG. 2B. RAID stripe 310 illustrates parity data in channel #12 with a total of 16 channels. The flow illustrated in FIG. 3 consists of accessing data in one of the channels where the channel is indicated by the value of j. When accessing the data, a CRC value is calculated on the data and compared to the stored CRC value at step 330 as indicated by Ci, Ci being the CRC value at each channel location i. If the CRC stored value does not match the calculated value, then the accessed data is deemed to be corrupt, and a RAID recovery process is initiated at step 340.

Accordingly, as an example, the RAID stripe 310, channel #7 is being accessed where the CRC stored value does not match a calculated CRC value. In such an example, a RAID recovery would be initiated by reading the remaining channels, for example, channels #1-#6 and #8-#16, summing the values to recover the correct data for channel #7. Additional details of this process are discussed in the following FIGS. 7-11.

Figure 4:
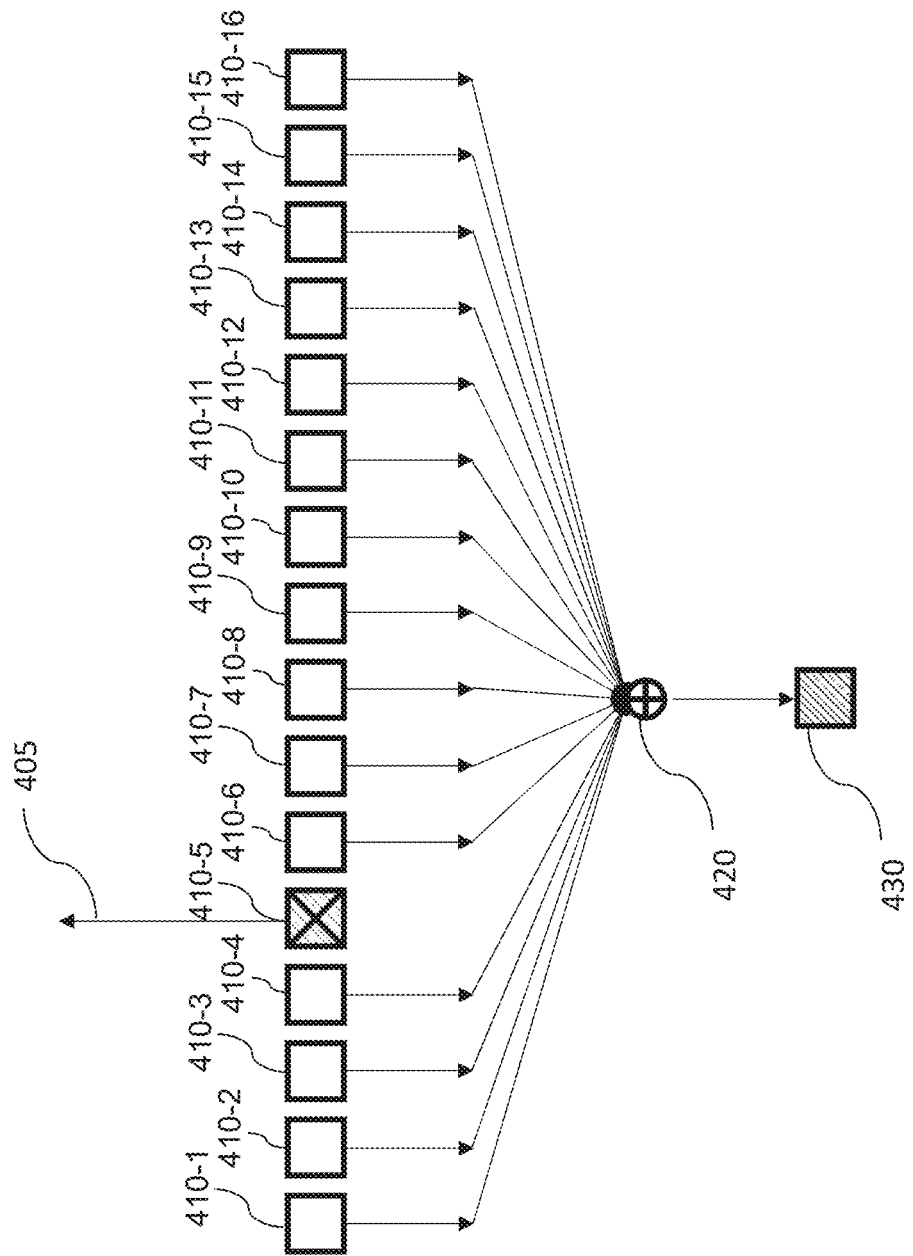
FIG. 4 is an illustration of a read operation in a RAID memory array, according to an embodiment of the present disclosure.

FIG. 4 is an illustration of a READ operation in a RAID memory array, according to an embodiment. A RAID memory array may include multiple memory devices, such as memory components 410-1, 410-2, through to 410-16 (individually or collectively referred to as memory components 410). FIG. 4 illustrates an example where memory component 410-5 has failed. Failure of a memory component can occur for a variety of reasons, including a physical failure such as a memory chip die due to temperature or physical failure. In the case of such a failure an attempt to read from memory component 410-5 as shown by read vector 405 will not return any data that may be contained in memory component 410-5.

In the case of attempting a READ operation from a failed memory component, the data may be recovered by using the remaining data in the stripe. The concept behind the RAID recovery is that data bit $d_i$ is binding in codewords by means of parity bits p by the following equation:

$$d_0+d_1+\ldots+d_{i-1}+d_i+d_{i+1}+\ldots+d_{k-1}+p=0$$

Thus, if $d_i$ represents the data in the failed memory component, the data can be recovered using the following constrain where:

$$d_i=p+d_0+d_1+\ldots+d_{i-1}+d_{i+1}+\ldots+d_{k-1}$$

The "plus" operation shown may simply be a logical XOR. The result is that the data from a single component failure in a RAID stripe can be recovered by reading and summing the remaining data, including the parity data, in the stripe.

Therefore, as shown in FIG. 4, in order to recover the data that was stored in memory component 410-5, the data from memory components 410-1, 410-2, 410-3, 410-4 and the data from memory components 410-6, 410-7, 410-8, 410-9, 410-10, 410-11, 410-12, 410-13, 410-14, 410-15, and 410-16 are read and summed together as shown by summation unit 420. The result of the summation is the recovered data 430. In an embodiment, once a determination has been made that a particular memory component has suffered a hard failure, the location or address of that failed memory component may be stored, for example in memory controller 110. Therefore, rather than attempting to perform a read, or write, operation on a memory component to determine if had previously suffered a hard failure, i.e., a chipkill event, the address of the operation could be compared to a table of known failed memory component addresses. If there is a match, then the memory controller could skip an attempt to perform the memory operation on that memory component and proceed directly to a RAID recovery operation.

Figure 5:
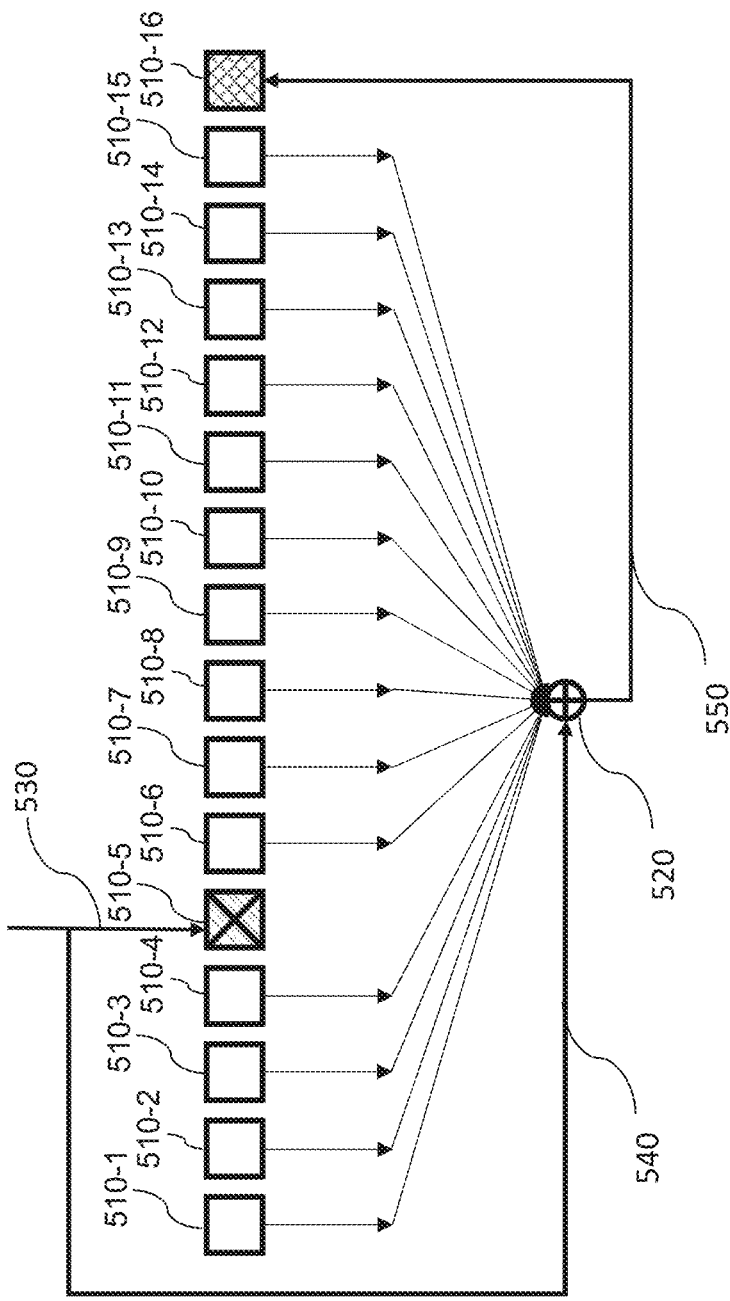
FIG. 5 is an illustration of a write operation to a failed component in a RAID memory array, according to an embodiment of the present disclosure.
Figure 6:
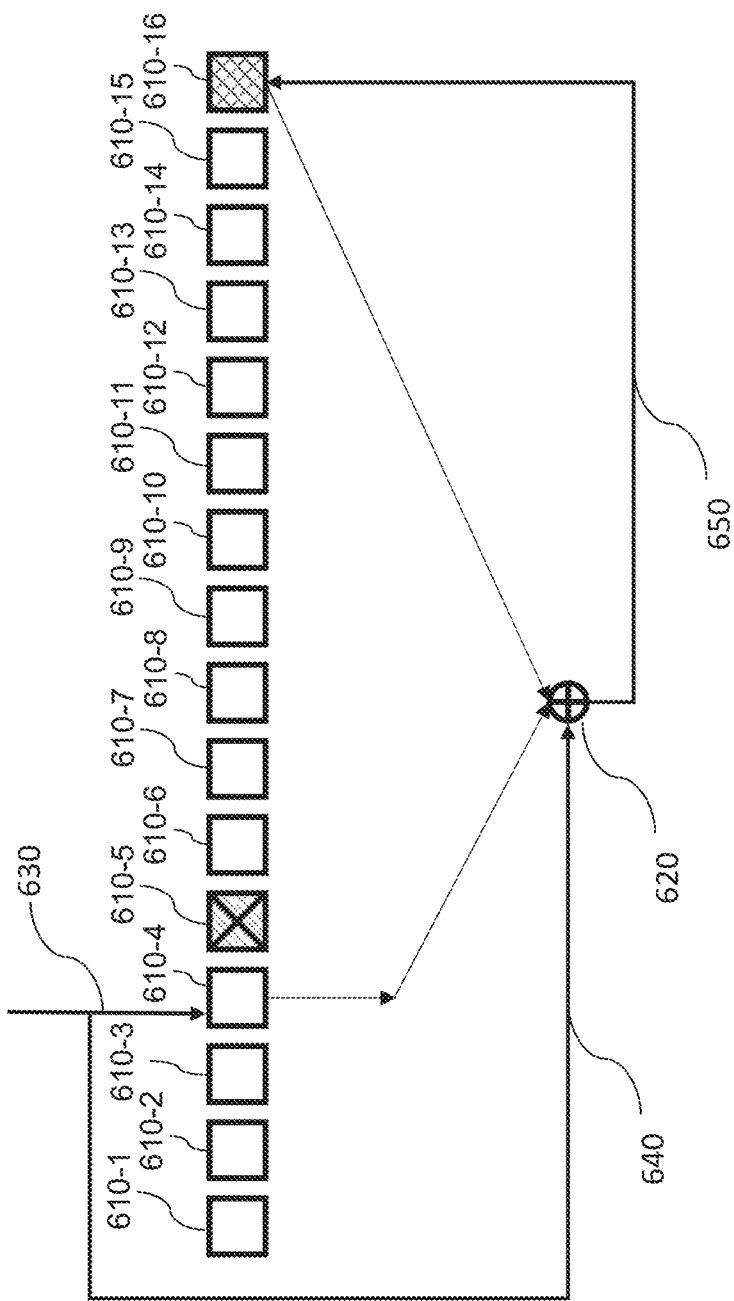
FIG. 6 is an illustration of a write operation to a component where the RAID stripe contains a failed component, according to an embodiment of the present disclosure.

FIG. 5 is an illustration of a WRITE operation to a failed memory component in a RAID memory array, according to an embodiment. There are three distinct types of WRITE operations that will be discussed. The first as shown in FIG. 5 is where the WRITE operation is attempting to write data to a failed component. The second as will be shown in FIG. 6 is where the WRITE operation is attempting to write data to an operative memory component in a stripe that includes a failed memory component. The third as will be shown in FIG. 7 is where the WRITE operation is attempting to write data to an operative memory component in a stripe that includes a failed memory component that is identified as a memory component containing the RAID parity data.

FIG. 5 illustrates an example of an attempt to perform a WRITE operation as shown by write vector 530 to memory component 510-5, which has incurred a hard failure. Note that the RAID parity value must be updated to reflect the data that is being attempted to be written into memory component 510-5. The process of determining that RAID parity value is accomplished by performing READ operations from all of the memory component locations, other than the failed memory component, summing them, including the data that is being attempted to be written to the failing memory component, and generating the new RAID parity value. Therefore, in this example where memory component 510-5 has suffered a hard failure, instead of performing a WRITE operation to memory component 510-5, a READ operation would be performed on memory components 510-1, 510-2, 510-3, 510-4, 510-6, 510-7, 510-8, 510-9, 510-10, 510-11, 510-12, 510-13, 510-14, and 510-15. The values in these 14 (n–2) memories component would be summed with the data that was intended to be written into memory component 510-5 as shown by path 540 and summed at 520. The result of that summation would be the new RAID parity value that would then be written to memory component 510-16 as shown by vector 550. In an embodiment, if a subsequent READ operation is attempted from memory component 510-5 and a failure table has recorded that memory component 510-5 as being a failed location, then rather than attempting a READ operation of memory component 510-5, a RAID recovery would be initiated that would include a READ operation to memory components 510-1 through 510-4 and 510-6 through 510-15 and the RAID parity value in memory component 510-16, thereby allowing the computation of the data that should have been stored in the failed memory component 510-5.

FIG. 6 is an illustration of a WRITE operation to an operational memory component in a RAID memory array, but where there is a failed memory component in the same RAID stripe, according to an embodiment. This is the second type of WRITE operation as previously discussed. In an example, memory component 610-5 has failed, but the intended WRITE operation is directed, as shown by write vector 630, to memory component 610-4. Before the new data in the WRITE operation can be written into memory component 610-4 a READ operation must be performed on both the RAID parity location, in this example, memory component 610-16, and from the memory component location that is intended to be written to. Thus, before new data, represented by write vector 630 can be written into memory component 610-4, a summation of the data existing in memory component 610-4, RAID parity memory component 610-16 and the new data represented by vector 640 are summed at summation 620, resulting in an updated RAID parity value which is subsequently written to RAID parity memory component 610-16 and also allowing the new data to be written into memory component 610-4.

Figure 7:
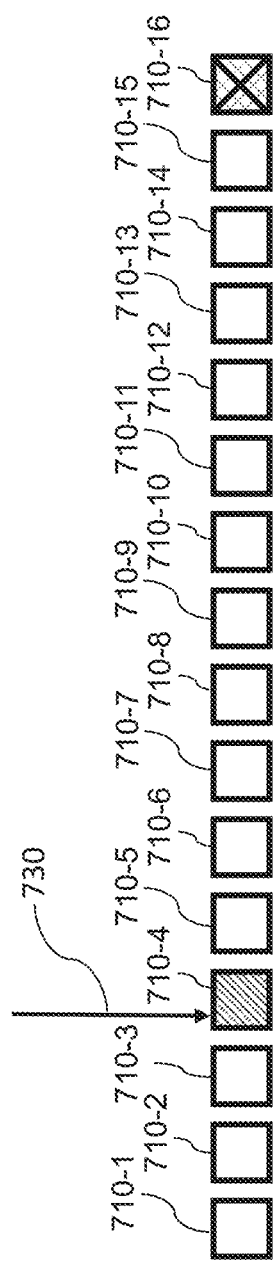
FIG. 7 is an illustration of a write operation to a component where the RAID stripe contains a failed component in the parity location, according to an embodiment of the present disclosure.

FIG. 7 is an illustration of a WRITE operation to an operational memory component in a RAID memory array, but where there is a failed memory component in the same RAID stripe at the RAID parity memory component, according to an embodiment. This is the third type of WRITE operation as previously discussed. While FIG. 7, as an example, illustrates the RAID parity location as the last location in the stripe, as previously discussed the RAID parity location may be distributed amongst all of the channels. In the example shown in FIG. 7 a WRITE operation is being attempted to memory component 710-4 as illustrated by write vector 730. As the RAID parity memory component is the failed location, no new RAID value can be stored. Thus, in this case, a RAID recovery could not be performed if a second memory component suffered a hard failure in the same RAID stripe. However, as previously discussed, each set of data being written or read from a memory component may also include CRC data that may be used to detect and/or correct soft errors within a data block, e.g., such as the UMBs previously illustrated.

Figure 8:
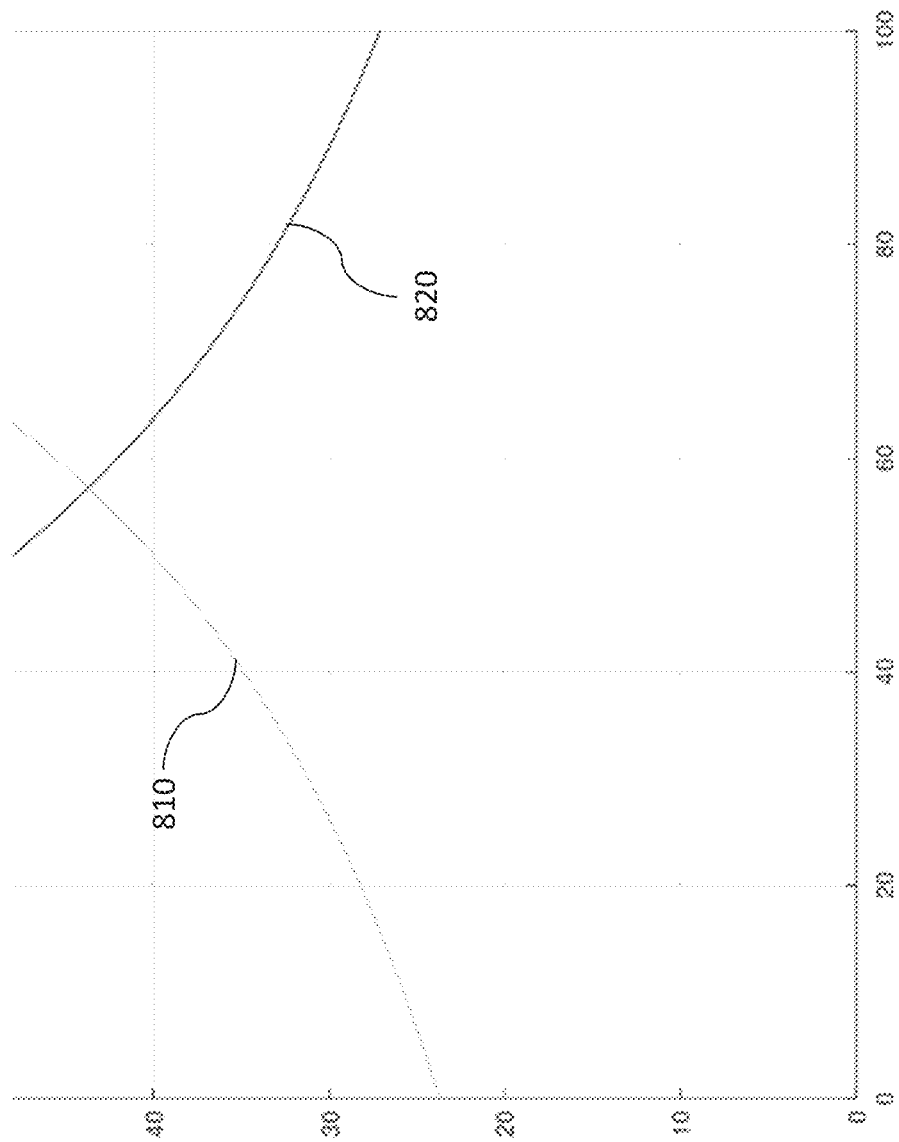
FIG. 8 is a graphical illustration of throughput in a CXL architecture, according to an embodiment of the present disclosure.

FIG. 8 is an illustration of theoretical upper bound of the throughput in a CXL device, according to an embodiment. The effective throughput may be less then this bound depending on the architecture of the ASIC and other bandwidth bottlenecks not relative to the CXL protocol. The X-axis of the chart illustrates the percentage of read operations. The Y-axis represents throughput in GB/sec. Thus, at the zero point of the X-axis the plot 810 represents 100% WRITE operations, and for the device associated with this chart, would have a throughput maximum of approximately 24 GB/sec. Further, at the 100% point on the X-axis that would represent no WRITE operations and 100% READ operations, the throughput would be approximately, 27 GB/sec.

The total CXL throughput may be represented as:

$$T = T_R + T_W$$

(total CXL throughput, T=total throughput; $T_R$=read throughput; $T_W$=write throughput)

Since:

$$T_R \rightarrow \alpha_R T_R \text{ read and } \beta_R T_R \text{ write}$$

$$T_W \rightarrow \alpha_W T_W \text{ write and } \beta_W T_W \text{ read}$$

Then:

$$B_R = \alpha_R T_R + \beta_W T_W \leq B$$

(B=maximum CXL bandwidth available on the single direction)

$$B_W = \alpha_W T_W + \beta_R T_R \leq B$$

But:

$$T_R = \rho T$$

($\rho$=percentage of read operations)

$$T_W = (1-\rho)T$$

Therefore:

$$\alpha_R \rho T + \beta_W (1-\rho) T \leq B \Rightarrow T \leq \frac{B}{\alpha_R \rho + \beta_W (1-\rho)}$$

$$\alpha_W (1-\rho) T + \beta_R \rho T \leq B \Rightarrow T \leq \frac{B}{\alpha_W (1-\rho) + \beta_R \rho}$$

Thus:

$$T \le \min\left\{\frac{B}{\alpha_R\rho + \beta_W(1-\rho)}, \frac{B}{\alpha_W(1-\rho) + \beta_R\rho}\right\}$$

Accordingly, throughput plot 810 may be represented by:

$$T = \left\{\frac{B}{\alpha_W(1-\rho) + \beta_R\rho}\right\}$$

Accordingly, throughput plot 820 may be represented by:

$$T = \left\{\frac{B}{\alpha_R\rho + \beta_W(1-\rho)}\right\}$$

Figure 9:
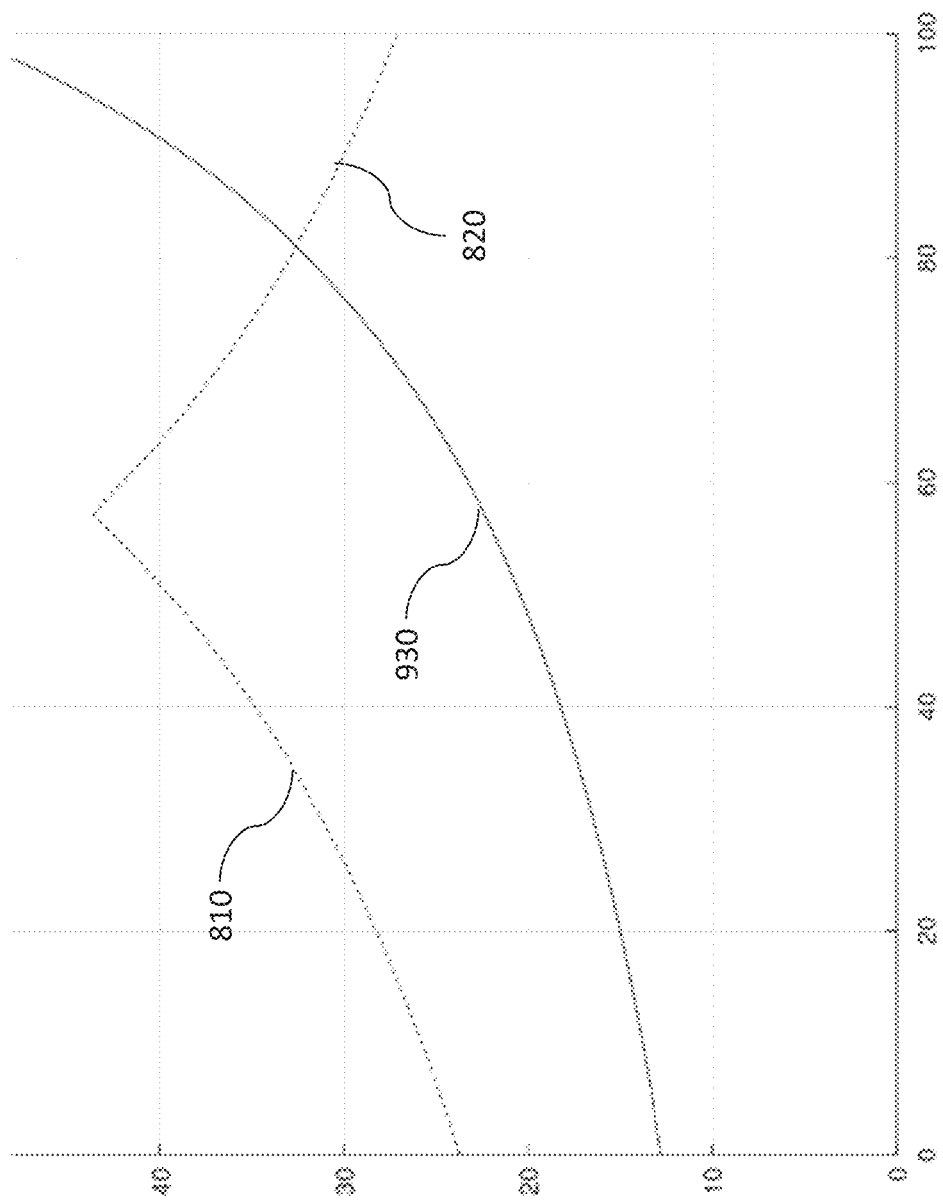
FIG. 9 is a graphical illustration of throughput in a CXL architecture consisting of read only operations, according to an embodiment of the present disclosure.

FIG. 9 is an illustration of theoretical upper bound of the throughput in a CXL device utilizing only READ operations, according to an embodiment. As in FIG. 8, the effective throughput may be less then this bound depending on the architecture of the ASIC and other bandwidth bottlenecks not relative to the CXL protocol. Also, as in FIG. 8, the X-axis of the chart illustrates the percentage of read operations while the Y-axis represents throughput in GB/sec. Plot 930 represents throughput where the READ operation is performed on a memory component that has experienced a hard failure.

Given:

$A_{CRC}$=1 or 1.5 depending *on* the CXL type ("A" represents an amplification factor of data reads or writes)

$A_{RAID}$=4

$A_R = A_{CRC}$ (read amplification)

$A_W = A_{CRC} A_{RAID}$ (write amplification)

Since:

$A_R\rho T + A_W(1-\rho)T \le M$ (M represents the maximum media bandwidth available)

Then, as represented by plot 930:

$$T \le \frac{M}{A_R\rho + A_W(1-\rho)}$$

Figure 10:
FIG. 10 is a graphical illustration of throughput in a CXL architecture consisting of write operations in a stripe containing a failed component, according to an embodiment of the present disclosure.

FIG. 10 is an illustration of theoretical throughput in a CXL device under different write operation states, according to an embodiment. Plot 810 and plot 820, as discussed in FIG. 8, represents a theoretical maximum throughput for a CXL memory device. Plot 930, as discussed in FIG. 9, represents the maximum throughput for a CXL memory device where the READ operations attempt to access a failed memory component. FIG. 10 illustrates two additional scenarios. Plot 1040 represents the maximum throughput associated with READ operations in a failed memory component and WRITE operations to a functional memory component, but with a failed memory component in the same stripe. Plot 1050 represents the maximum throughput associated with READ operations in a failed memory component and WROTE operations to a failed memory component.

Given:

$A_{CRC}$=1 or 1.5 depending *on* the CXL type ("A" represents an amplification factor of data reads or writes)

$A_{RAID}$=4

$A_R = A_{CRC}(N_{ch}-1)$ ($N_{ch}$ represents the number of channels in a memory device)

$$A_W = A_{CRC}\left(\frac{N_{ch}-1}{N_{ch}}\left(1 + \frac{N_{ch}-2}{N_{ch}-1}A_{RAID}\right) + \frac{1}{N_{ch}}\right)$$

Since:

$A_R\rho T + A_W(1-\rho)T \le M$ (M represents the maximum media bandwidth available)

Then, as represented by plot 1040:

$$T \le \frac{M}{A_R\rho + A_W(1-\rho)}$$

FIG. 10, in plot 1050, illustrates the throughput in a CXL device where the READ operations are in a failed memory component and the WRITE operations are to a failed memory component. As shown the throughput FIG. 11 shows an exemplary embodiment of a method 1100 for memory error recovery. Method 1100 begins at step 1105 with the determining that a memory component has sustained a hard failure in a Cyclic Redundancy Check-Redundant Array of Independent Devices (CRC-RAID) mechanism. For example, as discussed in FIG. 3, access to a particular memory component is made. In this example the memory component is determined to have suffered a hard failure by accessing the memory component where the stored CRC value, shown as $C_i$, does not match with a computed CRC value of the data in the memory component, e.g., CRC check at step 330. In another example, the memory component may be determined to have suffered a hard failure due to being non-responsive, for example where a memory chip stops functioning. The determining step may also take the form of accessing a table of known memory component failures prior to executing a READ or WRITE operation. The table may include the address of the hard fail areas, such as which device, bank, or other substructure such as a section or row. Then, at every access, the address of the operation is compared with the stored address and in the case of a match, the operation may start with a RAID recovery. In doing so, there is a benefit in reducing the read/write amplification, or additional steps of reading or writing data, and thus mitigating the performance reduction associated with a RAID recovery.

Step 1110 includes determining a location of the memory component failure, wherein the CRC-RAID mechanism comprises a plurality of memory components configured as a plurality of stripes. As inferred in step 1105, a memory component may be associated by an address or location that identifies a particular device or component. As discussed in FIG. 1, memory rank 130 may be located on one of a plurality of channels 120. Thus, a method of identifying a location of a memory component may be by an address.

Step 1115 includes initiating a WRITE operation of user data to a location within a particular strip, wherein the particular stripe contains a failed memory component. As discussed in FIG. 5, FIG. 6, and FIG. 7, WRITE operations may encounter different situations of a hard failure of a memory component. FIG. 5 discussed a WRITE operation to a failed memory component in a RAID memory array. If a WRITE operation is performed to a fully functional memory component with no failed memory components in the stripe, then there is no need to perform any additional recovery steps. However, if a WRITE operation is attempted to a stripe that does contain a hard fail area, then the WRITE operation actually starts by performing multiple READ operations as discussed in step 1120.

Step 1120 includes compensating for the failed memory component, wherein the compensating comprises a plurality of read operations prior to a writing of the user data. As discussed in FIG. 5, FIG. 6, and FIG. 7, the READ operations vary based on the location of the failure. Specifically, determination must be made whether the failed area is at the memory component being written to or whether the failed area is in a different memory component in the same stripe including if the failed area is at the RAID parity address.

Step 1125 includes the compensating steps necessary when the address of the failure is at the location being written to and previously discussed in FIG. 5. In this scenario, after determining that the write operation of user data is to a location within a particular stripe that is the location of the failed memory component, the compensating for the failed memory component comprises reading user data from the remainder of non-failed memory components in the particular stripe and performing a logical XOR operation on the read existing data from the remainder of non-failed memory components and the user data to be written to the failed memory component. The result of the logical XOR operation is the generation of a new RAID parity value that is then stored in the particular stripe.

FIG. 5 illustrated that the RAID parity value must be updated to reflect the data that is being attempted to be written into memory component 510-5 where the process of determining the new RAID parity value is accomplished by performing READ operations from all of the memory component locations, other than the failed memory component, summing them, including the data that is being attempted to be written to the failing memory component, and generating the new RAID parity value, which is then written to the RAID parity address for the stripe.

Step 1130 includes the compensating steps necessary when the address of the failure is not at the location being written to, but at a different location within the same stripe, as previously discussed in FIG. 6. In this scenario, after determining that the write operation of user data to a first location within a particular stripe where the failed memory component is at a second location within the particular stipe, the compensating for the failed memory component comprises reading an existing user data from the first location, reading an existing RAID parity data, and generating a new RAID parity value based on performing a logical XOR on the existing user data from the first location, the existing RAID parity data, and the new user data. The step then directs the storing the new user data and new RAID parity value in the particular stripe.

As discussed in FIG. 6, before the new data in the WRITE operation can be written into the operational memory component, a READ operation must be performed on both the RAID parity location and from the memory component location that is intended to be written to. Thus, before new data can be written into the operational memory component, a summation, e.g., logical XOR, of the data existing in memory component, RAID parity memory component and the new data represented are summed. The result of the summation is an updated RAID parity value which is subsequently written to RAID parity memory component and also allowing the new data to be written into the memory component.

As discussed in FIG. 7, if the failed memory component is the component that holds the RAID parity value, then the WRITE operation proceeds normally, acknowledging that the RAID parity value is non-existent and thus if another memory component in that stripe fails, recovery will not be possible.

The description and abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

The disclosure contained herein includes, for example, Example 1 is an apparatus relating to memory error recovery and includes a redundant array of independent devices (RAID) memory controller comprising a plurality of memory channels. The apparatus may include a plurality of memory arrays, wherein each memory array may be coupled to a memory channel of the plurality of memory channels, where each memory array comprises a plurality of memory components, and where each memory array is configured with a plurality of stripes. The apparatus may be configured such that in a write operation of user data to a location within a particular stripe of a memory array, the particular stripe comprises a failed memory component. In such a situation, the RAID memory controller is configured to determine and compensate for the failed memory component to allow for a recovery of the user data in the failed memory component.

An Example 2 is an apparatus of any preceding clause wherein each memory channel of the RAID memory controller comprises a cyclic redundancy check logic configured to detect memory errors within user data block (UDB). An Example 3 is an apparatus of any preceding clause an address of the failed memory component is recorded. An Example 4 is an apparatus of any preceding clause wherein prior to initiating a write operation the address of the write operation is compared to the recorded address of the failed memory component to determine a type of compensation to be used for recovery of the user data in the failed memory component. An Example 5 is an apparatus of any preceding clause further comprising a read operation of user data from a particular stripe of the memory array comprising a failed memory component, the RAID memory controller is configured to read the user data from a remainder of non-failed memory components in the particular stripe of the memory array, perform a logical XOR operation on the read data, and obtain the user data associated with the failed memory component. An Example 6 is an apparatus of any preceding clause wherein in the write operation of user data to a location within the particular stripe of the memory array, wherein the particular stripe comprises a failed memory component at the location of the stripe, the RAID memory controller is configured to compensate for the failed memory component comprising reading user data from a remainder of non-failed memory components in the particular stripe of the memory array, performing a logical XOR operating on the read existing data from the remainder of non-failed memory components and the user data to be written to the failed memory component, and generating a RAID parity value to be stored in the particular stripe. An Example 7 is an apparatus of any preceding clause wherein in the write operation of a new user data to a first location within the particular stripe of the memory array, wherein the particular stripe comprises a failed memory component at a second user data location of the stripe, the RAID memory controller is configured to compensate for the failed memory component comprising reading an existing user data from the first location, reading an existing RAID parity data, performing a logical XOR on the existing user data from the first location, the existing RAID parity data, and the new user data, and obtain a new RAID parity value, wherein the new user data and new RAID parity value are stored in the particular stripe. An Example 8 is an apparatus of any preceding clause wherein in the write operation of a new user data to a location within the particular stripe where the particular stripe comprises a failed memory component at a RAID parity location of the stripe, wherein the compensating for the failed memory component comprises writing the new user data to the location and determining that the RAID parity value is corrupt. An Example 9 is an apparatus of any preceding clause wherein each memory array comprises a RAID parity rotation. An Example 10 is an apparatus of any preceding clause wherein the RAID memory controller is implemented as a RAID-5 one failure recovery.

The disclosure contained herein may include a method, for example, an Example 11 for memory error recovery, comprising determining that a memory component has sustained a hard failure in a Cyclic Redundancy Check-Redundant Array of Independent Devices (CRC-RAID) mechanism. The method includes determining a location of the memory component failure, wherein the CRC-RAID mechanism comprises a plurality of memory components configured as a plurality of stripes and initiating a write operation of user data to a location within a particular stripe, wherein the particular stripe contains a failed memory component. The method further includes compensating for the failed memory component, wherein the compensating comprises a plurality of read operations prior to a writing of the user data.

An Example 12 is a method of any preceding clause wherein the CRC-RAID mechanism comprises a cyclic redundancy check logic configured to detect memory errors within user data block (UDB). An Example 13 is a method of any preceding clause further comprising recording the location of the failed memory component. An Example 14 is a method of any preceding clause wherein the determining a location of a memory component failure is based on the recording the location of the failed memory component. An Example 15 is a method of any preceding clause further comprising initiating a read operation of user data from a particular stripe comprising a failed memory component, wherein the read operation comprises reading data from a remainder of non-failed memory components in the particular stripe, perform a logical XOR operation on the read data, and obtaining the user data associated with the failed memory component. An Example 16 is a method of any preceding clause further comprising determining that the write operation of user data to a location within a particular stripe is the location of the failed memory component, wherein the compensating for the failed memory component comprises reading user data from a remainder of non-failed memory components in the particular stripe, performing a logical XOR operation on the read existing data from the remainder of non-failed memory components and the user data to be written to the failed memory component, and generating a RAID parity value to be stored in the particular stripe. An Example 17 is a method of any preceding clause further comprising determining that the write operation of user data to a first location within a particular stripe where the failed memory component is at a second location within the particular stipe, wherein the compensating for the failed memory component comprises reading an existing user data from the first location, reading an existing RAID parity data, generating a new RAID parity value based on performing a logical XOR on the existing user data from the first location, the existing RAID parity data, and the new user data, and storing the new user data and new RAID parity value in the particular stripe. An Example 18 is a method of any preceding clause further comprising determining that the write operation of user data to a location within a particular stripe wherein the failed memory component is at a second location within the particular stipe. An Example 19 is a method of any preceding clause wherein the CRC-RAID mechanism implements a RAID parity rotation. An Example 20 is a method of any preceding clause wherein the CRC-RAID mechanism is implemented as a RAID-5 one failure recovery.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. An apparatus, comprising:
   a redundant array of independent devices (RAID) memory controller comprising a plurality of memory channels; and a plurality of memory arrays, wherein each memory array of the plurality of memory arrays (i) is coupled to a memory channel of the plurality of memory channels (ii) comprises a plurality of memory components, and (iii) is configured with a plurality of stripes;

wherein, when a particular stripe of the plurality of stripes comprises a failed memory component during a write operation of user data to a location within the particular stripe of the plurality of stripes, the RAID memory controller is configured to determine and compensate for the failed memory component, thereby allowing for a recovery of the user data in the failed memory component; and wherein prior to initiating the write operation, an address of the write operation is compared to a recorded address of the failed memory component to determine a type of compensation to be used for recovery of the user data in the failed memory component.

2. The apparatus of claim 1, wherein each memory channel of the RAID memory controller comprises a cyclic redundancy check logic configured to detect memory errors within a user data block (UDB).

3. The apparatus of claim 1, wherein an address of the failed memory component is recorded.

4. The apparatus of claim 1, further comprising in a read operation of the user data from the particular stripe of the memory array comprising the failed memory component, the RAID memory controller is configured to read user data from a remainder of non-failed memory components in the particular stripe of the memory array, perform a logical XOR operation on the read data, and obtain the user data associated with the failed memory component.

5. The apparatus of claim 1, wherein in the write operation of the user data to the location within the particular stripe of the memory array, wherein the particular stripe comprises a failed memory component at the location of the particular stripe, the RAID memory controller is configured to compensate for the failed memory component comprising reading user data from a remainder of non-failed memory components in the particular stripe of the memory array, performing a logical XOR operating on a read existing data from the remainder of non-failed memory components and the user data to be written to the failed memory component, and generating a RAID parity value to be stored in the particular stripe.

6. The apparatus of claim 1, wherein in a write operation of a new user data to a first location within the particular stripe of the memory array, wherein the particular stripe comprises a failed memory component at a second location of the stripe, the RAID memory controller is configured to compensate for the failed memory component comprising reading an existing user data from the first location, reading an existing RAID parity data, performing a logical XOR on the existing user data from the first location, the existing RAID parity data, and the new user data, and obtaining a new RAID parity value, wherein the new user data and new RAID parity value are stored in the particular stripe.

7. The apparatus of claim 1, wherein in a write operation of a new user data to a location within the particular stripe where the particular stripe comprises a failed memory component at a RAID parity location of the stripe, wherein the compensating for the failed memory component comprises writing the new user data to the location, and determining that a RAID parity value is corrupt.

8. The apparatus of claim 1, wherein each memory array comprises a RAID parity rotation.

9. The apparatus of claim 1, wherein the RAID memory controller is implemented as a RAID-5 one failure recovery.

10. A method for memory error recovery, comprising:
determining that a memory component has sustained a hard failure in a Cyclic Redundancy Check-Redundant Array of Independent Devices (CRC-RAID) mechanism;

determining a location of the memory component failure, by recording the location of the memory component failure, wherein the CRC-RAID mechanism comprises a plurality of memory components configured as a plurality of stripes;

initiating a write operation of user data to a location within a particular stripe, wherein the particular stripe contains a failed memory component; and compensating for the failed memory component, wherein the compensating comprises a plurality of read operations prior to a writing of the user data;

wherein prior to initiating the write operation, an address of the write operation is compared to a recorded address of the failed memory component to determine a type of compensation to be used for recovery of the user data in the failed memory component.

11. The method of claim 10, wherein the CRC-RAID mechanism comprises a cyclic redundancy check logic configured to detect memory errors within a user data block (UDB).

12. The method of claim 10, further comprising initiating a read operation of the user data from the particular stripe comprising the failed memory component, wherein the read operation comprises reading data from a remainder of non-failed memory components in the particular stripe, perform a logical XOR operation on the read data, and obtaining the user data associated with the failed memory component.

13. The method of claim 10, further comprising determining that the write operation of the user data to the location within the particular stripe is a location of the failed memory component, wherein the compensating for the failed memory component comprises reading user data from a remainder of non-failed memory components in the particular stripe, performing a logical XOR operation on the read existing data from the remainder of non-failed memory components and the user data to be written to the failed memory component, and generating a RAID parity value to be stored in the particular stripe.

14. The method of claim 10, further comprising determining that the write operation of the user data is to a first location within the particular stripe where the failed memory component is at a second location within the particular stipe, wherein the compensating for the failed memory component comprises reading an existing user data from the first location, reading an existing RAID parity data, generating a new RAID parity value based on performing a logical XOR on the existing user data from the first location, the existing RAID parity data, and the new user data, and storing the new user data and new RAID parity value in the particular stripe.

15. The method of claim 10, further comprising initiating the write operation of user data to a location within a particular stripe wherein the failed memory component is at a second location within the particular stipe.

16. The method of claim 10, wherein the CRC-RAID mechanism implements a RAID parity rotation.

17. The method of claim 10, wherein the CRC-RAID mechanism is implemented as a RAID-5 one failure recovery.

* * * * *